United States Patent
Ning et al.

(10) Patent No.: US 11,380,925 B2
(45) Date of Patent: Jul. 5, 2022

(54) SYSTEM AND METHOD OF OPERATING BATTERIES

(71) Applicant: Dell Products L.P., Round Rock, TX (US)

(72) Inventors: Yan Ning, Cedar Park, TX (US); Philip Conde, Austin, TX (US); Subramanian Vasudvan, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 16/830,665

(22) Filed: Mar. 26, 2020

(65) Prior Publication Data

US 2021/0305608 A1    Sep. 30, 2021

(51) Int. Cl.
| | |
|---|---|
| *H01M 8/0662* | (2016.01) |
| *H01M 8/0668* | (2016.01) |
| *H01M 8/1004* | (2016.01) |
| *B01D 71/02* | (2006.01) |

(52) U.S. Cl.
CPC ........ *H01M 8/0687* (2013.01); *B01D 71/028* (2013.01); *H01M 8/0668* (2013.01); *H01M 8/1004* (2013.01)

(58) Field of Classification Search
None
See application file for complete search history.

(56) References Cited

U.S. PATENT DOCUMENTS

| | | | | |
|---|---|---|---|---|
| 2014/0178724 | A1* | 6/2014 | Saruwatari | H01M 50/543 429/82 |
| 2020/0152930 | A1* | 5/2020 | Singer | H01M 10/6552 |

OTHER PUBLICATIONS

Himeno, Shuji, et al. "Synthesis and permeation properties of a DDR-type zeolite membrane for separation of CO2/CH4 gaseous mixtures." *Industrial & Engineering Chemistry Research* 46.21 (2007): 6989-6997.

(Continued)

*Primary Examiner* — Brian R Ohara
*Assistant Examiner* — Patrick Marshall Greene
(74) *Attorney, Agent, or Firm* — Baker Botts L.L.P.

(57) ABSTRACT

In one or more embodiments, a battery may include one or more cells and one or more enclosures that respectively enclose the one or more cells. For example, at least a portion of each enclosure of the one or more enclosures may include a zeolite material that is configured to permit first molecules associated with a first diameter to exit the enclosure and configured to inhibit second molecules associated with a second diameter, greater than the first diameter, from entering the enclosure. In one instance, the first molecules may include $CO_2$ molecules. In another instance, the second molecules may include $H_2O$ molecules. In one or more embodiments, the zeolite material may be a DDR-type zeolite material. For example, the DDR-type zeolite material may be applied on a porous α-alumina substrate. In one or more embodiments, the battery may provide power to one or more components of an information handling system.

18 Claims, 3 Drawing Sheets

(56) References Cited

OTHER PUBLICATIONS

Jeevarajan, J., and M. Manzo. "Limitations of internal protective devices in high-voltage/high-capacity batteries using lithium-ion cylindrical commercial cells." *NASA Engineering and Safety Center Technical Bulletin* 2 (2009).
Hedlund, Jonas. *Thin films of molecular sieves: synthesis and applications*. Diss. Luleå tekniska universitet, 1998.
Gatta, G. D., and Yongjae Lee. "Zeolites at high pressure: A review." *Mineralogical Magazine* 78.2 (2014): 267-291.

\* cited by examiner

SYSTEM AND METHOD OF OPERATING BATTERIES

BACKGROUND

Field of the Disclosure

This disclosure relates generally to information handling systems and more particularly to operating batteries of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various wireless devices can be powered via a battery. As one example, a device can include a hand-held tool, which can be powered via a battery. For instance, a hand-held tool can include a cordless hand-held tool. As another example, a device can include an information handling system, which can be powered via a battery. A battery can include one or more cells and one or more enclosures that respectively enclosure the one or more cells. The one or more cells can emit gases during operation of the battery. For example, a cell can emit gases during operation of the battery. For instance, the gases may build up, which can result in pressure building inside an enclosure of the cell. If the pressure exceeds a threshold pressure, the gases can cause an enclosure of a cell to expand and/or to swell. The gases building enough pressure inside an enclosure, to expand and/or to swell the enclosure, can happen due to one or more reasons, such as a poor cell design, a poor cell manufacturing process, an overcharge of a cell, an excessive temperature of a cell, a deep discharge of a cell, mechanical damage of an electrode and/or a cell, a charge history, and/or a discharge history, among others. Expanding and/or swelling of an enclosure of a cell can cause damage to one or more components of an information handling system. For example, expanding and/or swelling of an enclosure of a cell can cause one or more touch pad distortions, one or more keyboard malfunctions, one or more touch pad malfunctions, and/or one or more chassis deformations, among others. Expanding and/or swelling of an enclosure of a cell can cause one or more safety issues. For example, expanding and/or welling of an enclosure of a cell can cause one or more short circuits and/or one or more fires, among others.

SUMMARY

In one or more embodiments, an information handling system may include at least one processor; a memory medium, coupled to the at least one processor, that stores instructions executable by the at least one processor; and a battery that provides power to the at least one processor and the memory medium, among others. In one or more embodiments, the battery may include one or more cells and one or more enclosures that respectively encloses the one or more cells. For example, at least a portion of the enclosure may include a zeolite material that is configured to permit first molecules associated with a first diameter to exit the enclosure and to inhibit second molecules associated with a second diameter, greater than the first diameter, from entering the one or more enclosures. In one instance, each of the first molecules has a diameter greater than 0.01 nanometers (nm) and less than 0.27 nm. In a second instance, each of the second molecules has a diameter greater than 0.27 nm and less than 10 nm. In a third instance, the first molecules may include carbon dioxide ($CO_2$) molecules. In another instance, the second molecules may include water ($H_2O$) molecules.

In one or more embodiments, the zeolite material may be a DDR-type zeolite material. For example, the DDR-type zeolite material may be applied on the porous substrate. For instance, the porous substrate may be an $\alpha$-alumina substrate. In one or more embodiments, the battery may be a lithium-ion battery. For example, the one or more cells may include one or more lithium-ion cells.

In one or more embodiments, one or more systems, one or more methods, and/or one or more processes may configure an enclosure, for a cell of a battery, with a portion of the enclosure operable for a zeolite material that is configured to permit first molecules associated with a first diameter to travel through the zeolite material and to inhibit second molecules associated with a second diameter, greater than the first diameter, from traveling through the zeolite material; may fasten the zeolite material in the portion of the enclosure operable for the zeolite material; and may enclose one or more cells of the battery in the enclosure. In one example, each of the first molecules may have a diameter greater than 0.01 nm and less than 0.27 nm. In a second example, each of the second molecules may have a diameter greater than 0.27 nm and less than 10 nm. In a third example, the first molecules may include $CO_2$ molecules. In another example, the second molecules may include $H_2O$ molecules. In one or more embodiments, the battery may be a lithium-ion battery. For example, the one or more cells may include one or more lithium-ion cells.

In one or more embodiments, the one or more systems, the one or more methods, and/or the one or more processes may apply the zeolite material on a porous substrate. In one or more embodiments, the porous substrate that permits the first molecules to travel through the porous substrate. In one or more embodiments, the zeolite material may include DDR-type zeolite material. For example, the porous substrate may be an $\alpha$-alumina substrate.

In one or more embodiments, a battery may include one or more cells and one or more enclosures that respectively encloses the one or more cells. For example, at least a portion of each of the one or more enclosures includes a zeolite material that is configured to permit first molecules associated with a first diameter to exit the enclosure and to inhibit second molecules associated with a second diameter, greater than the first diameter, from entering the one or more enclosures. In one instance, the first molecules may include $CO_2$ molecules. In another instance, the second molecules may include $H_2O$ molecules. In one or more embodiments, the zeolite material may be a DDR-type zeolite material. For example, the DDR-type zeolite material may be applied on a porous α-alumina substrate.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, it may be advantageous to permit the enclosure of the battery to release the gases that are emitted during operation of the battery to prevent the gases from exceeding the threshold pressure. For example, a vent may release the gases that are emitted during operation of the battery, but the vent may also permit other gases to enter the enclosure. For instance, the other gases may damage and/or degrade the one or more cells of the battery. As an example, water gas may damage and/or degrade the one or more cells of the battery. As another example, carbon dioxide ($CO_2$) may be a gas emitted during operation of the battery. For instance, a cell of a battery may produce $CO_2$ molecules during operation of the battery.

In one or more embodiments, it may be advantageous to configure the enclosure of the battery to include a porous material that permits the gases that are emitted during operation of the battery to exit the enclosure while inhibiting or stopping the other gases to enter the enclosure. In one example, the porous material may permit molecules associated with a first diameter to pass through the porous material. In another example, the porous material may inhibit molecules associated with a second diameter from passing through the porous material. For instance, the second diameter may be greater than the first diameter.

In one or more embodiments, the porous material may include pores that are associated with a window opening. In one example, the window opening may be associated with a length and a width. In another example, the window opening of the porous material may be associated with a diameter. In one or more embodiments, the porous material may permit molecules with a diameter less or equal to than a window opening of the porous material to pass through while inhibiting molecules with a diameter greater than the window opening of the porous material. For example, inhibiting molecules with the diameter greater than the window opening of the porous material may include rejecting molecules with the diameter greater than the window opening of the porous material.

In one or more embodiments, permitting molecules of up to a size to penetrate pores of the porous material while rejecting molecules greater than the size may be called or termed molecular sieving. As an example, a $CO_2$ molecule may be associated with a diameter of 0.232 nanometers (nm). As another example, a water ($H_2O$) molecule may be associated with a diameter of 0.275 nm. In one or more embodiments, $H_2O$ molecule may be in a gaseous state. In one or more embodiments, the window opening of the porous material may permit $CO_2$ molecules to pass through the porous material. In one or more embodiments, the window opening of the porous material may inhibit $H_2O$ molecules from passing through the porous material. For example, the window opening of the porous material may reject $H_2O$ molecules from passing through the porous material. In one or more embodiments, a diameter of the window opening of the porous material may be less than 0.275 nm. In one or more embodiments, a length of the window opening of the porous material may be less than 0.275 nm. In one or more embodiments, a width of the window opening of the porous material may be less than 0.275 nm. In one or more embodiments, a diameter of the window opening of the porous material may be greater than or equal to 0.232 nm. In one or more embodiments, a length of the window opening of the porous material may be greater than or equal to 0.232 nm. In one or more embodiments, a width of the window opening of the porous material may be greater than or equal to 0.232 nm.

In one or more embodiments, the porous material may be or include a zeolite material. For example, the zeolite material may be an aluminosilicate mineral. For instance, the zeolite material may have different crystal structures that determine one or more pore diameters. In one or more embodiments, the zeolite material may be configured with one or more specific pore diameters. In one or more embodiments, the zeolite material may include all-silica decadodecasil 3 rhombohedral (DDR). For example, the porous material may be or include a DDR-type zeolite material.

Figure 1:
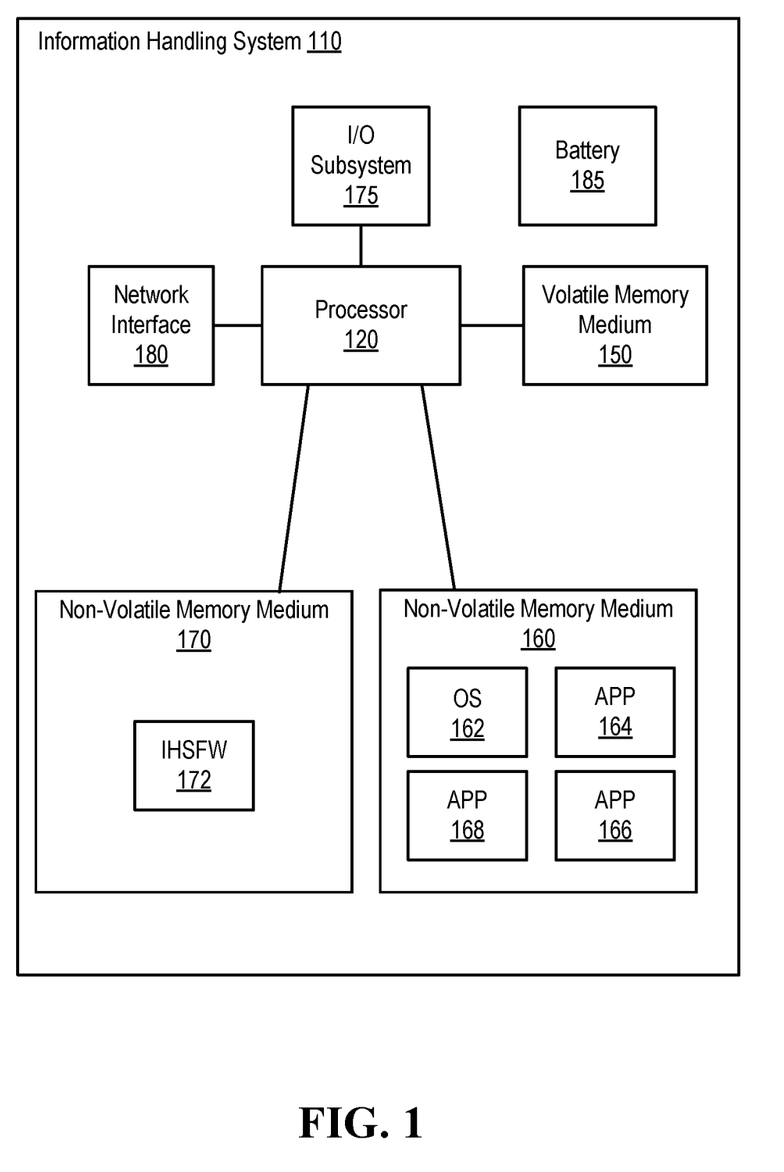
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

As illustrated, IHS 110 may include a battery 185. In one or more embodiments, battery 185 may provide power to one or more components of IHS 110, among others. For example, battery 185 may provide power to one or more of processor 120, volatile memory medium 150, non-volatile memory medium 160, non-volatile memory medium 170, and network interface 180, among others. In one or more embodiments, battery 185 may provide power to one or more devices and/or one or more peripheral devices coupled to IHS 110, among others.

Figure 2A:
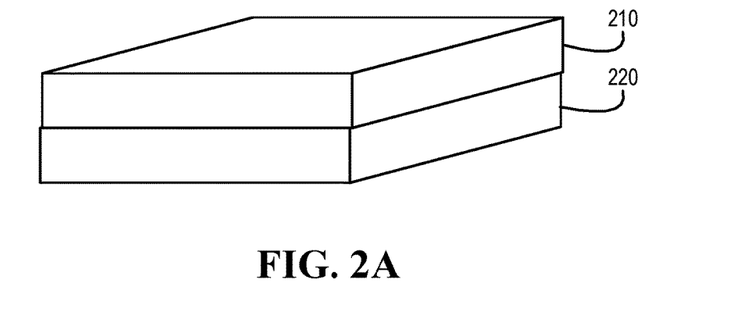
FIG. 2A illustrates an example of a material applied to a porous substrate, according to one or more embodiments.

Turning now to FIG. 2A, an example of a material applied to a porous substrate is illustrated, according to one or more embodiments. As shown, a material 210 may be applied to a porous substrate 220. In one or more embodiments, applying material 210 to porous substrate 220 may include depositing material 210 on porous substrate 220. In one or more embodiments, material 210 may be a zeolite material. For example, material 210 may be a DDR-type zeolite material. In one or more embodiments, porous substrate 220 may be a ceramic. For example, porous substrate 220 may be an alumina substrate. For instance, porous substrate 220 may be an α-alumina substrate. In one or more embodiments, material 210 may be a membrane. For example, material 210 may be a hydrophobic membrane. For example, the hydrophobic membrane may include a DDR-type zeolite material.

In one or more embodiments, material 210 may be or include a porous material. In one or more embodiments, material 210 may permit first molecules to travel through material 210. For example, each of the first molecules may have a diameter greater than 0.01 nm and less than 0.27 nm. For instance, the first molecules may include $CO_2$ molecules. In one or more embodiments, porous substrate 220 may permit the first molecules to travel through porous substrate 220. In one or more embodiments, porous substrate 220 may not inhibit the second molecules from traveling through porous substrate 220.

In one or more embodiments, material 210 may inhibit second molecules from traveling through material 210. For example, each of the second molecules may have a diameter greater than 0.27 nm and less than 10 nm. For instance, the second molecules may include $H_2O$ molecules. In one or more embodiments, material 210 inhibiting the second molecules from traveling through material 210 may include material 210 rejecting the second molecules. For example, material 210 inhibiting the second molecules from traveling through material 210 may include material 210 rejecting the second molecules from traveling through material 210.

Figure 2B:
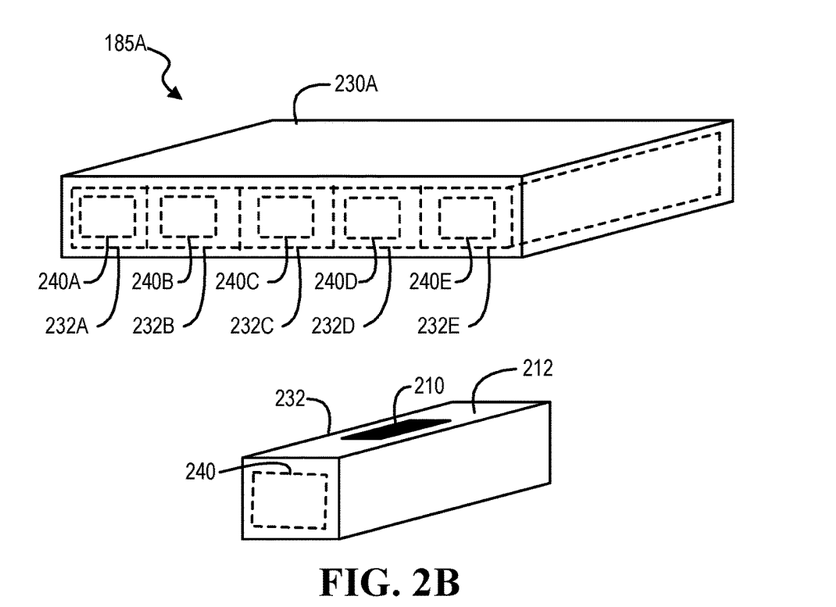
FIG. 2B illustrates an example of a battery, according to one or more embodiments.

Turning now to FIG. 2B, an example of a battery is illustrated, according to one or more embodiments. As shown, a battery 185A may include an enclosure 230A. Although not specifically illustrated, an enclosure 230 may include one or more vents, according to one or more embodiments. As illustrated, battery 185A may include cells 240A-240E. In one or more embodiments, enclosure 230A may enclose cells 240A-240E. As shown, enclosures 232A-232E may enclose cells 240A-240E. As illustrated, at least a portion of enclosure 232 may include material 210. In one example, material 210 may permit the first molecules to exit enclosure 232. For instance, material 210 may be configured to permit the first molecules associated with a first diameter to exit enclosure 232. In another example, material 210 may inhibit the second molecules from entering enclosure 232. For instance, material 210 may inhibit the second molecules associated with a second diameter, greater than the first diameter, from entering enclosure 232. In one or more embodiments, one or more of cells 240A-240E may emit the first molecules. In one or more embodiments, material 210 may be located anywhere on and/or in enclosure 232. In one or more embodiments, the first molecules may generate a pressure. For example, when the pressure is equal to or greater than a threshold pressure, material 210 may permit the first molecules to pass through material 210. For instance, when the pressure is equal to or greater than the threshold pressure, material 210 may permit the first molecules to exit enclosure 232. In one or more embodiments, the threshold pressure may be from 0.1 millimeters (mm) of mercury to 1 mm of mercury.

In one or more embodiments, a portion 212 of enclosure 232 may inhibit the first molecules and the second molecules from entering and/or exiting enclosure 232. For example, portion 212 may include a plastic and/or a metal, among others. In one instance, portion 212 may be rigid. In another instance, portion 212 may be flexible. In one or more embodiments, enclosure 232 may embody a cuboid box. In one or more embodiments, enclosure 232 may embody a bag, a pouch, etc.

Figure 2C:
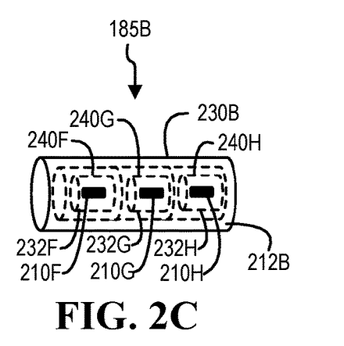
FIG. 2C illustrates another example of an enclosure and a battery, according to one or more embodiments.

Turning now to FIG. 2C, another example of an enclosure and a battery is illustrated, according to one or more embodiments. As shown, a battery 185B may include an enclosure 230B. As illustrated, battery 185B may include cells 240F-240H. In one or more embodiments, enclosures 230B may enclose cells 240F-240H. As shown, enclosures 232F-232H may respectively enclose cells 240F-240H. As illustrated, enclosures 232F-232H may respectively materials 210F-210H. In one example, materials 210F-210H may permit the first molecules to respectively exit enclosures 232F-232H. For instance, materials 210F-210H may be configured to permit the first molecules associated with a first diameter to respectively exit enclosures 232F-232H. In another example, materials 210F-210H may inhibit the second molecules from entering respective enclosures 232F-232H. For instance, materials 210F-210H may inhibit the second molecules associated with a second diameter, greater than the first diameter, from entering respective enclosures 232F-232H. In one or more embodiments, one or more of cells 240F-240H may emit the first molecules.

In one or more embodiments, a portion 212B of enclosure 230B may inhibit the first molecules and the second molecules from entering and/or exiting enclosure 230B. For example, portion 212B may include a plastic and/or a metal. In one instance, portion 212B may be rigid. In another instance, portion 212B may be flexible. In one or more embodiments, battery 185B and/or enclosure 230B may include a cylindrical shape.

Figure 2D:
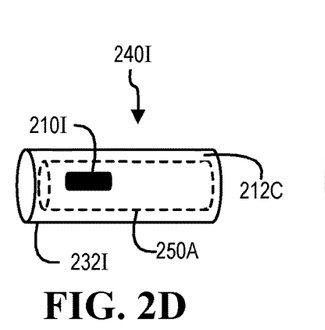
FIG. 2D illustrates an example of a cell and an enclosure, according to one or more embodiments.

Turning now to FIG. 2D, an example of a cell and an enclosure is illustrated, according to one or more embodiments. As shown, a cell 240I may include an enclosure 232I. In one or more embodiments, cell 240I may be a cell of a battery 185. As illustrated, at least a portion of enclosure 232I may include a material 210I. In one example, material 210I may permit the first molecules to exit enclosure 232I. For instance, material 210I may be configured to permit the first molecules associated with a first diameter to exit enclosure 232I. In another example, material 210I may inhibit the second molecules from entering enclosure 232I. For instance, material 210I may inhibit the second molecules associated with a second diameter, greater than the first diameter, from entering enclosure 232I. In one or more embodiments, a subcell 250A of cell 240I may emit the first molecules. In one or more embodiments, subcell 250A may include one or more structures and/or one or more functionalities as those described with a cell 240.

In one or more embodiments, a portion 212C of enclosure 232I may inhibit the first molecules and the second molecules from entering and/or exiting enclosure 232I. For example, portion 212C may include a plastic and/or a metal. In one instance, portion 212C may be rigid. In another instance, portion 212C may be flexible. In one or more embodiments, cell 240I and/or enclosure 232I may include a cylindrical shape.

Figure 2E:
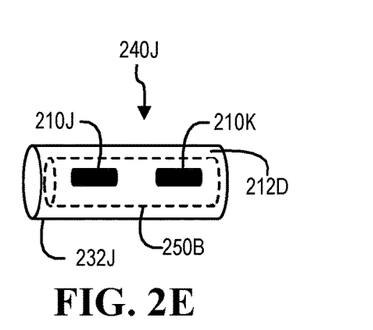
FIG. 2E illustrates another example of a cell and an enclosure, according to one or more embodiments.

Turning now to FIG. 2E, another example of a cell and an enclosure is illustrated, according to one or more embodiments. As shown, a cell 240J may include an enclosure 232J. In one or more embodiments, cell 240J may be a cell of a battery 185. In one or more embodiments, an enclosure 232 may include multiple materials 210. As illustrated, at least a portion of enclosure 232J may include a material 210J. As shown, at least another portion of enclosure 232J may include a material 210K. In one example, materials 210J and 210K may permit the first molecules to exit enclosure 232J. For instance, materials 210J and 210K may be configured to permit the first molecules associated with a first diameter to exit enclosure 232J. In another example, materials 210J and 210K may inhibit the second molecules from entering enclosure 232J. For instance, materials 210J and 210K may inhibit the second molecules associated with a second diameter, greater than the first diameter, from entering enclosure 232J. In one or more embodiments, a subcell 250B of cell 240J may emit the first molecules. In one or more embodiments, subcell 250B may include one or more structures and/or one or more functionalities as those described with a cell 240.

In one or more embodiments, a portion 212D of enclosure 232J may inhibit the first molecules and the second molecules from entering and/or exiting enclosure 232J. For example, portion 212D may include a plastic and/or a metal. In one instance, portion 212D may be rigid. In another instance, portion 212D may be flexible. In one or more embodiments, cell 240J and/or enclosure 232J may include a cylindrical shape.

In one or more embodiments, if an enclosure 230 of a battery 185 includes a material 210, a current interrupt device (CID) may not be needed and/or required. For example, the CID may include a pressure valve that may permanently ruin battery 185 if an internal pressure of battery 185 exceeds a threshold pressure (e.g., 1,000 kPa). For instance, a portion of the CID may fracture, break, and/or crack, which may break a circuit associated with battery 185 and/or may permit gas to escape battery 185. In one or more embodiments, when the portion of the CID fractures, breaks, and/or cracks, battery 185 may be ruined and/or may be permanently damaged. In one or more embodiments, the gas may include the first molecules. For example, material 210 may permit the first molecules to exit enclosure 230. For instance, when material 210 permits the first molecules to exit enclosure 230, an internal pressure of battery 185 may not exceed the threshold pressure. In one or more embodiments, when the internal pressure of battery 185 does not exceed the threshold pressure, the CID may not be needed and/or required.

In one or more embodiments, if an enclosure 232 of a cell 240 includes a material 210, a CID may not be needed and/or required. For example, the CID may include a pressure valve that may permanently ruin cell 240 if an internal pressure of cell 240 exceeds a threshold pressure (e.g., 1,000 kPa). For instance, a portion of the CID may fracture, break, and/or crack, which may break a circuit associated with cell 240 and/or may permit gas to escape cell 240. In one or more embodiments, when the portion of the CID fractures, breaks, and/or cracks, cell 240 may be ruined and/or may be permanently damaged. In one or more embodiments, the gas may include the first molecules. For example, material 210 may permit the first molecules to exit enclosure 232. For instance, when material 210 permits the first molecules to exit enclosure 232, an internal pressure of cell 240 may not exceed the threshold pressure. In one or more embodiments, when the internal pressure of cell 240 does not exceed the threshold pressure, the CID may not be needed and/or required.

Figure 3:
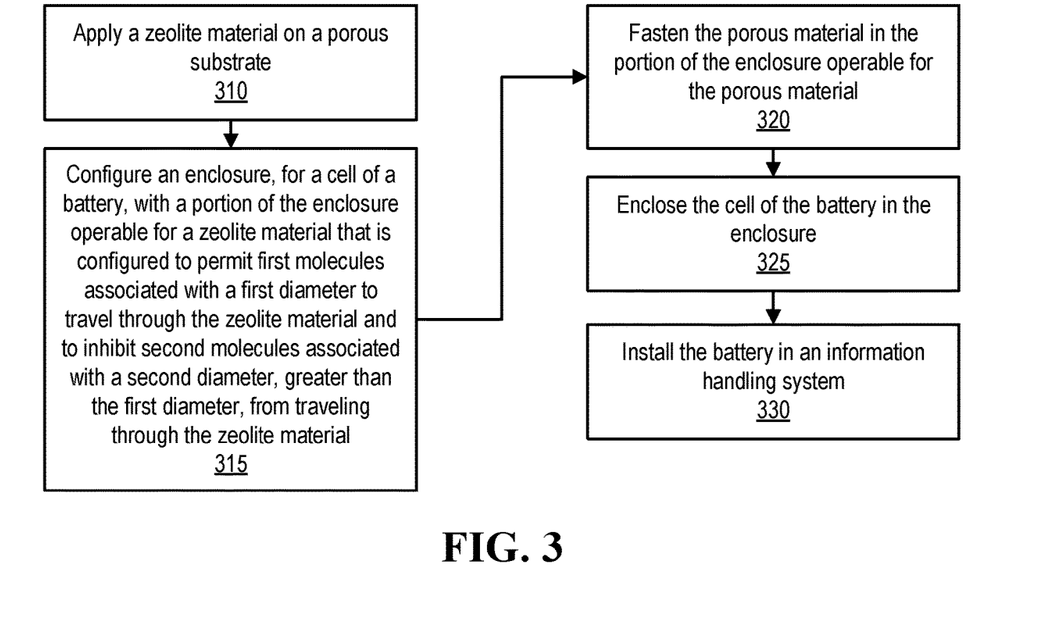
FIG. 3 illustrates an example of a method of making a battery, according to one or more embodiments.

Turning now to FIG. 3, an example of a method of making a battery is illustrated, according to one or more embodiments. At 310, a zeolite material may be applied on a porous substrate. In one or more embodiments, the zeolite material may include DDR-type zeolite material. In one or more embodiments, the porous substrate may include a ceramic. For example, the porous substrate may include an alumina substrate. For instance, the porous substrate may include an α-alumina substrate.

Figure 4A:
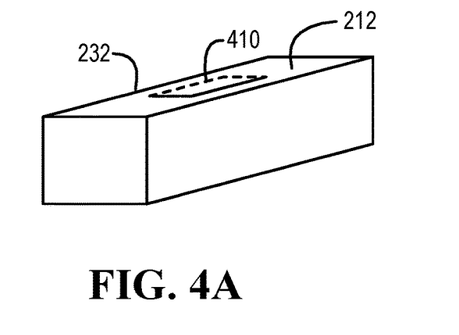
FIG. 4A illustrates an example of an enclosure configured with a portion operable for a material, according to one or more embodiments.
Figure 4B:
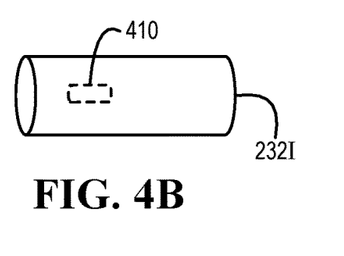
FIG. 4B illustrates a second example of an enclosure configured with a portion operable for a material, according to one or more embodiments.
Figure 4C:
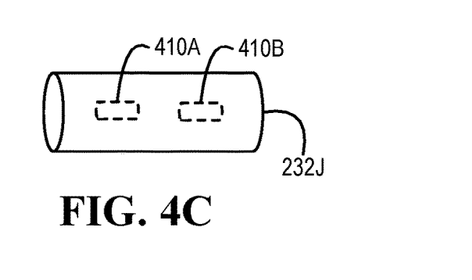
FIG. 4C illustrates another example of an enclosure configured with multiple portions operable for multiple materials, according to one or more embodiments

At 315, an enclosure, for the battery, may be configured with a portion of the enclosure operable for the zeolite material that is configured to permit first molecules associated with a first diameter to travel through the zeolite material and to inhibit second molecules associated with a second diameter, greater than the first diameter, from traveling through the zeolite material. In one example, as illustrated in FIG. 4A, enclosure 232 may be configured with a portion 410 operable for material 210. In a second example, as illustrated in FIG. 4B, enclosure 232I may be configured with a portion 410 operable for material 210I. In another example, as illustrated in FIG. 4C, enclosure 232J may be configured with multiple portions 410A and 410B operable for materials 210J and 210K, respectively. In one or more embodiments, material 210 may be or include the zeolite material.

In one or more embodiments, configuring the enclosure with the portion of the enclosure operable for the zeolite material may include cutting the enclosure for the portion of the enclosure operable for the porous material. In one or more embodiments, configuring the enclosure with the portion of the enclosure operable for the zeolite material may include removing material of the enclosure for the portion of the enclosure operable for the zeolite material. In one or more embodiments, each of the first molecules has a diameter greater than 0.01 nm and less than 0.27 nm. In one or more embodiments, each of the second molecules has a diameter greater than 0.27 nm and less than 10 nm. In one or more embodiments, the first molecules may include $CO_2$ molecules. In one or more embodiments, the second molecules may include $H_2O$ molecules.

At 320, the zeolite material may be fastened in the portion of the enclosure operable for the porous material. For example, material 210 may be or include the zeolite material. For instance, material 210 may be fastened in a portion of enclosure 230 operable for material 210. At 325, one or more cells of the battery may be enclosed in the enclosure. For example, one or more cells 240 may be enclosed in enclosure 230. In one or more embodiments, the battery may be a lithium-ion battery. For example, the one or more cells of the battery may include one or more lithium-ion cells. At 330, the battery may be installed in an information handling system. For example, battery 185 may be installed in IHS 110.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory medium, coupled to the at least one processor, that stores instructions executable by the at least one processor; and
   a battery configured to provide power to the at least one processor and the memory medium;
   wherein the battery includes:
      one or more cells; and
      one or more enclosures that respectively enclose the one or more cells, wherein at least a portion of each of the one or more enclosures includes a decadodecasil 3 rhombohedral (DDR)-type zeolite material that is configured to permit first molecules associated with a first diameter to exit the enclosure and to inhibit second molecules associated with a second diameter, greater than the first diameter, from entering the one or more enclosures.

2. The information handling system of claim 1,
   wherein the first molecules include carbon dioxide ($CO_2$) molecules; and
   wherein the second molecules include water ($H_2O$) molecules.

3. The information handling system of claim 2,
wherein the battery is a lithium-ion battery; and
wherein the one or more cells include one or more lithium-ion cells.

4. The information handling system of claim 1, wherein the DDR-type zeolite material is applied on the porous substrate.

5. The information handling system of claim 4, wherein the porous substrate is an α-alumina substrate.

6. The information handling system of claim 1,
wherein each of the first molecules has a diameter greater than 0.01 nanometers (nm) and less than 0.27 nm; and
wherein each of the second molecules has a diameter greater than 0.27 nm and less than 10 nm.

7. A method, comprising:
configuring an enclosure, for a cell of a battery, with a portion of the enclosure operable for a decadodecasil 3 rhombohedral (DDR)-type zeolite material that is configured to permit first molecules associated with a first diameter to travel through the zeolite material and to inhibit second molecules associated with a second diameter, greater than the first diameter, from traveling through the zeolite material;
fastening the zeolite material in the portion of the enclosure operable for the zeolite material; and
enclosing the cell of the battery in the enclosure.

8. The method of claim 7,
wherein the zeolite material is applied on a porous substrate; and
wherein the porous substrate that permits the first molecules to travel through the porous substrate.

9. The method of claim 8, further comprising:
applying the zeolite material on the porous substrate.

10. The method of claim 8, wherein the porous substrate is an α-alumina substrate.

11. The method of claim 7,
wherein each of the first molecules has a diameter greater than 0.01 nanometers (nm) and less than 0.27 nm; and
wherein each of the second molecules has a diameter greater than 0.27 nm and less than 10 nm.

12. The method of claim 7,
wherein the first molecules include carbon dioxide ($CO_2$) molecules; and
wherein the second molecules include water ($H_2O$) molecules.

13. The method of claim 12,
wherein the battery is a lithium-ion battery; and
wherein the cell includes a lithium-ion cell.

14. A battery, comprising:
one or more cells; and
one or more enclosures that respectively enclose the one or more cells, wherein at least a portion of each of the one or more enclosures includes a decadodecasil 3 rhombohedral (DDR)-type zeolite material that is configured to permit first molecules associated with a first diameter to exit the enclosure and to inhibit second molecules associated with a second diameter, greater than the first diameter, from entering the one or more enclosures.

15. The battery of claim 14,
wherein the first molecules include carbon dioxide ($CO_2$) molecules; and
wherein the second molecules include water ($H_2O$) molecules.

16. The battery of claim 15,
wherein the battery is a lithium-ion battery; and
wherein the one or more cells include one or more lithium-ion cells.

17. The battery of claim 15,
wherein the DDR-type zeolite material is applied on a porous α-alumina substrate.

18. The battery of claim 15,
wherein each of the first molecules has a diameter greater than 0.01 nanometers (nm) and less than 0.27 nm; and
wherein each of the second molecules has a diameter greater than 0.27 nm and less than 10 nm.

* * * * *